United States Patent [19]

Kossatz

[11] 4,328,178

[45] May 4, 1982

[54] PROCESS OF PRODUCING A BUILDING PRODUCT OF GYPSUM, PARTICULARLY A GYPSUM SLAB

[76] Inventor: Gert Kossatz, No. 33, Bohnenkamp, 3300 Braunschweig, Fed. Rep. of Germany

[21] Appl. No.: 148,070

[22] Filed: May 12, 1980

[30] Foreign Application Priority Data

May 14, 1979 [DE] Fed. Rep. of Germany ....... 2919311

[51] Int. Cl.$^3$ ............................ B28B 1/08; B29J 5/00; B29C 23/00
[52] U.S. Cl. ...................................... 264/69; 106/110; 156/39; 264/122; 264/256; 264/333; 366/2
[58] Field of Search .......................... 156/39; 106/110; 264/333, DIG. 43, 256, 82, 232, 69, 122; 366/2, 6, 40

[56] References Cited

U.S. PATENT DOCUMENTS

| | | | |
|---|---|---|---|
| 69,614 | 10/1867 | Bean | 106/110 |
| 101,268 | 3/1870 | Hyatt | 106/110 |
| 664,682 | 1/1951 | Zoradi | 156/39 |
| 2,125,046 | 7/1938 | Crandall | 366/40 |
| 2,537,509 | 1/1951 | Camp | 156/73.6 |
| 2,803,575 | 8/1957 | Riddell et al. | 156/39 |
| 3,290,018 | 12/1966 | Stapelfeldt | 366/2 |
| 3,592,670 | 7/1971 | Kossuth et al. | 106/110 |
| 4,028,454 | 6/1977 | Davidovits et al. | 264/DIG. 43 |
| 4,117,070 | 9/1978 | O'Neill | 264/333 |
| 4,183,763 | 1/1980 | Omilinsky et al. | 106/110 |

FOREIGN PATENT DOCUMENTS

| | | | |
|---|---|---|---|
| 49-31012 | 8/1974 | Japan | 264/DIG. 43 |
| 645821 | 11/1950 | United Kingdom | 106/111 |

OTHER PUBLICATIONS

Whittington, "Whittington's Dictionary of Plastics", Technomic Pub. Co., Stamford, Conn. (4/1975), p. 104.
Randall et al., Plastics Eng. Handbook, Reinhold, N.Y., (1960), p. XI.

*Primary Examiner*—Willard E. Hoag
*Attorney, Agent, or Firm*—John C. Smith, Jr.

[57] ABSTRACT

This invention provides a process of producing a building product, particularly a gypsum slab having preferably a density of below 800 kg/m$^3$, with gypsum and mixing water. The quantity of mixing water required for rehydration and molding is at least substantially completely introduced into the gypsum by means of water saturated porous particles added in a distributed form. The process comprises the steps of intimately mixing water saturated particles with pulverous gypsum to form a fluid mixture; converting said fluid mixture at least almost completely without the application of pressure to the shape of a gypsum building product; permitting mixing water of the water saturated particles to be absorbed by the pulverous gypsum, and permitting the resulting mixture to set and harden.

22 Claims, No Drawings

PROCESS OF PRODUCING A BUILDING PRODUCT OF GYPSUM, PARTICULARLY A GYPSUM SLAB

BACKGROUND OF THE INVENTION

This invention relates to the production of building material, and more particularly to a process of producing a building product of gypsum, particularly a gypsum slab, preferably with a volumetric weight of $<0.8$ g/cm$^3$ for the dry building product, in which process the quantity of mixing water required for rehydration and molding is preferably or exclusively introduced into the gypsum by means of water saturated porous particles added in a distributed form.

A process of this kind, together with the relevant apparatus, is already known from U.S. Pat. No. 3,809,566. In this known process the gypsum is given an addition of crushable water saturated particles from which the water required for the rehydration is removed by subjecting the mixture to a high pressure between 3.4 and 51 N/mm$^2$. In practice, therefore, this method calls for correspondingly large presses and is not suitable for building products of low density. Furthermore, pressure-proof water-impregnated particles are not suitable for this process.

Industrial gypsums, which include semi-hydrate plasters and anhydrous plasters, are rehydrated, with the addition of water, to form dihydrates. In this process, semi-hydrate and anhydrite are first of all dissolved in the mixing water, forming solutions which are supersaturated in relation to the dihydrate and from which the gypsum rapidly crystallizes out into crystals which undergo felting. The rehydration is an exothermic process, for the reaction of plaster and water is accompanied by the release of energy.

The quantity of water which is required for complete rehydration and which is thus chemically bound depends on the degree of purity of the industrial gypsums concerned and is usually between 14 and 21%.

In the rehydration of the industrial gypsums to form dihydrate, however, the customary wet process, in which the gypsum is processed in a pulpy or liquid consistency, necessitates the adoption of a considerable quantity of surplus water; the required ratio of water to gypsum in hard mold gypsum, for instance, is about 0.4, while with building gypsum it amounts to 0.7-0.8. Some of the surplus mixing water already emerges during compression in the mold, while some of it, after the setting process, is present as free water in the dihydrate, and in prefabricated building elements, such as gypsum boards, gypsum cardboard slabs or gypsum fiber slabs, it is expelled by an operation involving the supply of heat, i.e. by industrial drying.

Attempts have already been made to limit this consumption of heat by ensuring that the surplus mixing water introduced into the mixture is kept to a minimum from the outset. This has been done, for example, by spraying water into a loosened current of pulverous plaster through a nozzle or by mixing the said current with fine ice crystals. In practice neither method proves satisfactory in every case, since in the spraying operation an additional mixture of gypsum and water on the mold base can hardly be avoided, while the use of ice crystals involves the consumption of additional heat.

SUMMARY OF THE INVENTION

It is the object of the present invention to avoid these drawbacks and to provide a process of producing a building product of gypsum, particularly a gypsum slab, in which in a simple yet suitable manner, avoiding the pulpy-liquid phase, the plaster is provided, by the addition of particles acting as water deposits, only with that quantity of mixing water which is necessary for rehydration and for shaping a fluid material in a semi-dry process, so that after the hardening of the building product only a very small quantity of surplus water has to be expelled.

To attain this object the present invention provides a process for producing a building product, particularly a gypsum slab having preferably a density of below 800 kg/m$^3$, with gypsum and mixing water, wherein the quantity of mixing water required for rehydration and molding is at least substantially completely introduced into the gypsum by means of water saturated porous particles added in a distributed form, comprising the steps of intimately mixing water saturated particles with pulverous gypsum to form a fluid mixture; converting said fluid mixture at least almost completely without the application of pressure to the shape of a gypsum building product; permitting mixing water of the water saturated particles to be absorbed by the pulverous gypsum, and permitting the resulting mixture to set and harden, special consideration being given to the particular interaction between the water-retaining properties of the added particles and the water-attracting properties of the semi-hydrate.

Nearly any water-saturable porous particulate material, with the exception of calcined gypsum, may be used as filler. Examples of particulate material useful in this process as filler material include but are not limited to comminuted gas concrete, inflation clay, inflation mica, foam glass, mineral glass, synthetic resin foam flakes, wood shavings, wood fiber granulate and bark, vermiculite, perlite and combinations thereof.

The use of accelerators or retarders enables the time characteristics of the solidification process to be influenced. By the addition of liquefier or flow-forming agents such as known in concrete engineering the quantity of mixing water required can be reduced, as the surface tension of the water is lowered and a lubricating film is formed on the surface.

By the addition of hydrophobic agents the finished building product can be protected from the absorption of water. Other substances which may be added include agents reducing the tendency of reinforcement materials to corrode, agents improving adhesion to strips of cardboard and fibrous material and coloring agents.

The added particles can easily absorb water as a result of their porosity and retain it until owing to their intimate contact with the gypsum, the gypsum absorbs the water without the need for the application of any appreciable pressure for the removal of the water from the added particles; on the contrary, the necessary intimate contact can be brought about by mere agitation, of which the intensity and duration are determined by trial and error. The height to which the mixture has to be poured on is likewise determined by experiment, in such a way that after the material has set the desired thickness will be obtained in the building component produced.

Particularly with thin building components, gentle scraping or rolling may suffice, taking the desired thickness into account. In non-continuous production it may be of advantage to apply a moderate surface pressure, under about 1.5 N/mm², in order to improve the accuracy obtained for the thickness of slab-shaped building products.

EXAMPLE 1

1 Part by weight of an inflated mineral glass (perlite) was given an addition of 2.8 parts by weight of water and mixed with 8 parts by weight of an ordinary commercial flower of gypsum. The water had been given an addition of 3 parts by weight of an ordinary commercial flow-forming agent of which the base consisted of a malamine-formaldehyde condensation product. The mixture was introduced into a mold box and shaken for 1 min. The set gypsum slab was removed from the mold box after 15 min.

The water-gypsum value w was 0.35. The ratio of additives to gypsum was x=0.13. The density of the slab was about 650 kg/m³.

EXAMPLE 2

1 Part by weight of an inflation mica (vermiculite) was given an addition of 4 parts by weight of water and mixed with 10 parts by weight of a commercial flower of gypsum. The water had been given an addition of 4% by weight of a commercial concrete liquefier (Cerinol-13 Super, Deitermann Chemie). The mixture was introduced into a mold box and smoothed down to the desired thickness with a steel ruler. The set gypsum slab was removed from the mold box after 20 min.

The water-gypsum value was w=0.4. The ratio of additives to gypsum was x=0.1. The density of the slab was approximately 600 kg/m³.

EXAMPLE 3

1 Part by weight of dihydrate grains (porous gypsum granulate) with a grain size of between 1 mm and 5 mm was given an addition of 0.6 parts by weight of water and mixed with 3 parts by weight of a commercial flower of gypsum. The mixture was poured onto a mold base, being sprayed with 0.6 parts by weight of water in the process and then rolled to the desired thickness. The set gypsum slab was removed from the molding process after 10 min.

The water-gypsum value, taking the whole of the added water into account, was w=0.4, while the ratio of additives to gypsum was x=0.33. The density of the gypsum slab was approximately 800 kg/m³.

EXAMPLE 4

1 Part by weight of a wood fiber granulate was given an addition of 2 parts by weight of water and mixed with 5 parts by weight of a commercial flower of gypsum. The mixture was poured onto a mold base and compressed to the desired thickness with a specific surface pressure of 0.8 N/mm². The set gypsum slab was removed from the molding process after 25 min.

The water-gypsum value was w=0.4 and the ratio of additive to the gypsum was x=0.2. The density of the slab was approximately 900 kg/m³.

EXAMPLE 5

A gypsum slab was produced in accordance with EXAMPLE 4, with a three-layer structure symmetrical to its plane. The middle layer consisted of fiber granulate of 3-10 mm mesh, with a water-gypsum value of w=0.4 and an additive-to-gypsum ratio of x=0.3. The two covering layers consisted of fiber-reinforced flower of gypsum with a water-gypsum value of w=0.35 and an additive-to-gypsum ratio of x=0.1.

It is to be understood that the description is in all cases to be interpreted as merely illustrative of the principles of the invention, rather than limiting the same in any way, since it is contemplated that various changes may be made in various elements to achieve like results without departing from the spirit of the invention or the scope of the appended claims.

What is claimed is:

1. A semi-dry process of producing a building product, particularly a gypsum slab having a density below 800 kg/m³, with gypsum and mixing water, wherein the quantity of mixing water required for rehydration and molding is at least substantially completely introduced into the gypsum by means of water saturated porous filler particles added in a distributed form, said process comprising the steps of:
   (a) wetting particles consisting predominately of porous filler until they are just substantially saturated and intimately mixing the water saturated filler particles with pulverous calcined gypsum to form a fluid particulate mixture, the amount of water contained in said water saturated particles being limited to assure formation of said fluid particulate mixture and hydration of said calcined gypsum but being insufficient to form a pulpy-liquid phase mixture;
   (b) forming said fluid particulate mixture, at least almost completely without the application of pressure, into the shape of a gypsum building product;
   (c) permitting mixing water of the water saturated particles to be absorbed by the pulverous gypsum, and
   (d) permitting the resulting mixture to set and harden.

2. A process as set forth in claim 1 wherein pressure is applied to said mixture in an amount less than 1.5 N/mm².

3. A process as set forth in claim 2, wherein the fluid mixture is placed on a mold surface and, by shaking, is given the desired shape, particularly the desired slab thickness for the gypsum building product.

4. A process as set forth in claim 2, wherein the fluid mixture is placed on a mold surface and is smoothed down to the desired shape, particularly to the desired slab thickness for the gypsum building product.

5. A process as set forth in claim 2, wherein the fluid mixture is placed on a mold surface and is rolled down to the desired shape, particularly to the desired slab thickness for the gypsum building product.

6. A process as set forth in claim 2, wherein the fluid mixture is placed on a mold surface and is given the desired shape, particularly the desired slab thickness for the gypsum building product, by the application of a slight surface pressure, under about 1.5 N/mm².

7. A process as set forth in claim 2, wherein the water-saturated porous particles consist of dihydrate grains which act as crystallization nuclei and of which the grain size is mainly 1-5 mm.

8. A process as set forth in claim 2, wherein accelerators are added to the mixing water.

9. A process as set forth in claim 2, wherein retarders are added to the mixing water.

10. A process as set forth in claim 2, wherein the mixing water is given an addition of agents selected from the group consisting of liquefiers and flow-forming agents, which reduce the surface tension of the mixing water, form a lubricating film on the surface or provide a combination of both effects.

11. A process as set forth in claim 2 wherein said water-saturated porous particles comprise comminuted gas concrete.

12. A process as set forth in claim 2 wherein said water-saturated porous particles comprise inflation clay.

13. A process as set forth in claim 2 wherein said water-saturated porous particles comprise inflation mica.

14. A process as set forth in claim 2 wherein said water-saturated porous particles comprise foam glass.

15. A process as set forth in claim 2 wherein said water-saturated porous particles comprise mineral glass.

16. A process as set forth in claim 2 wherein said water-saturated porous particles comprise synthetic resin foam flakes.

17. A process as set forth in claim 2 wherein said water-saturated porous particles comprise wood shavings.

18. A process as set forth in claim 2 wherein said water-saturated porous particles comprise wood fiber granulate and bark.

19. A process as set forth in claim 2 wherein said water-saturated porous particles comprise vermiculite.

20. A process as set forth in claim 2 wherein said water-saturated porous particles comprise perlite.

21. A process as set forth in claim 2 wherein the maximum weight ratio of water to gypsum is 0.4:1.

22. A process as set forth in claim 21 wherein the weight ratio of water to gypsum is 0.33:1 to 0.4:1.

* * * * *